Oct. 11, 1932.  C. E. JEFFERS  1,881,624
DEMOUNTABLE WHEEL LOCK
Filed June 1, 1928   2 Sheets-Sheet 1
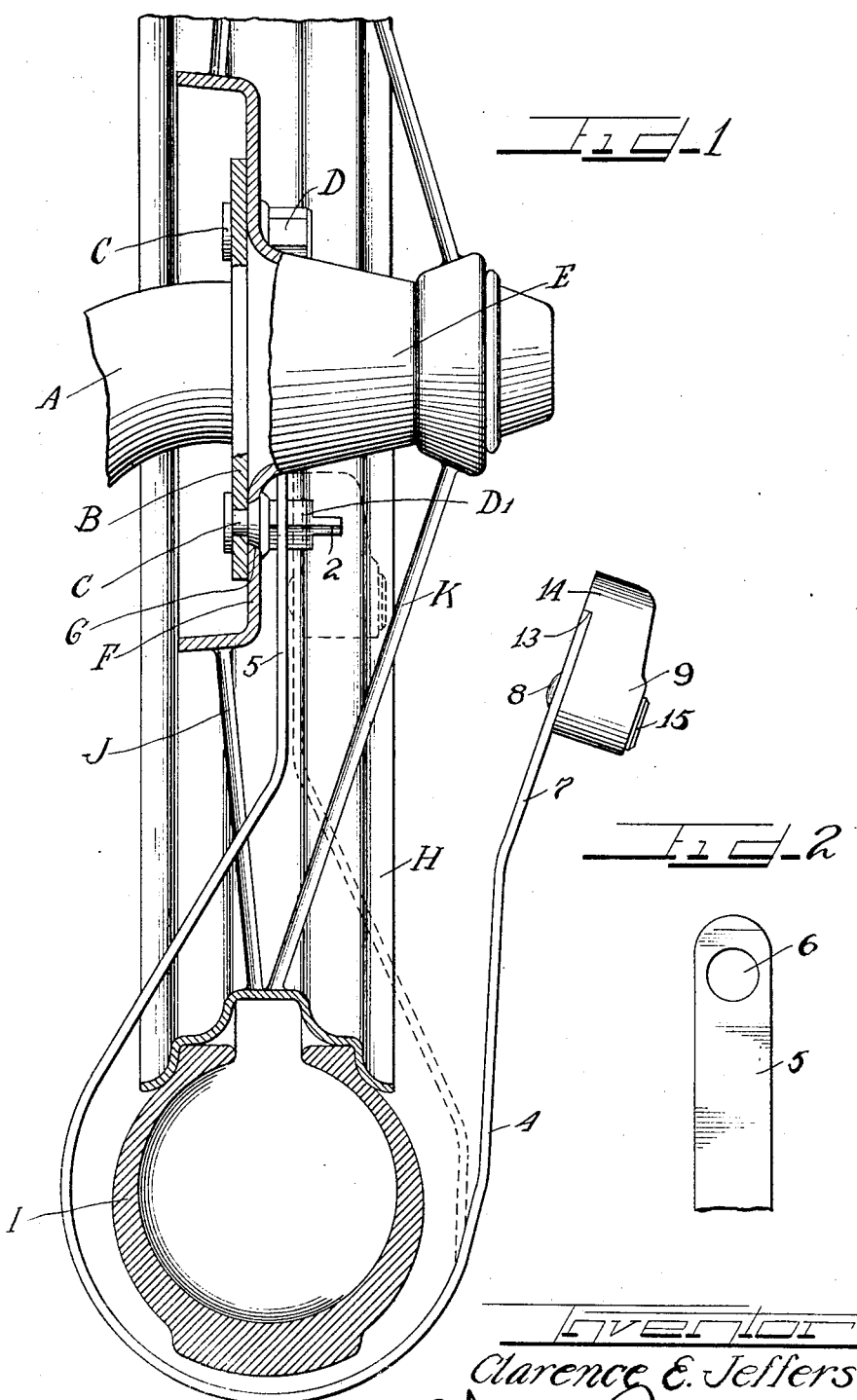
Inventor
Clarence E. Jeffers
by Charles Hills
Attys.

Oct. 11, 1932.  C. E. JEFFERS  1,881,624
DEMOUNTABLE WHEEL LOCK
Filed June 1, 1928  2 Sheets-Sheet 2
Fig.3.
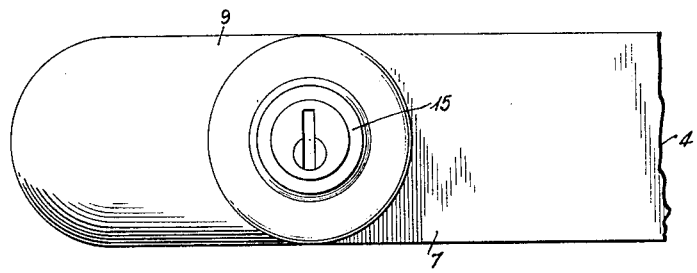
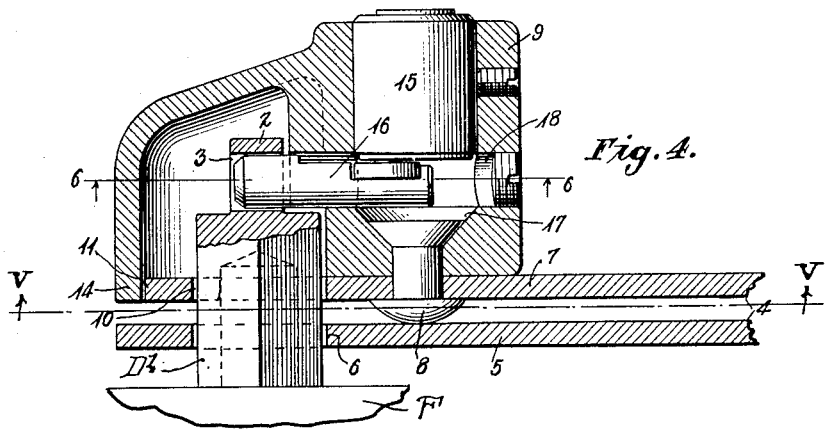
Fig.4.
Fig.5.
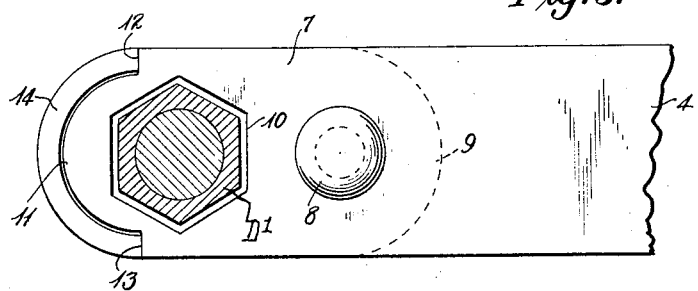
Fig.6.
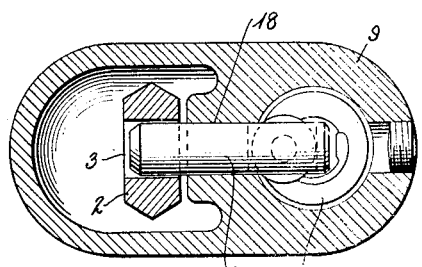
INVENTOR.
*Clarence E. Jeffers*
BY
ATTORNEYS Patented Oct. 11, 1932

1,881,624

UNITED STATES PATENT OFFICE

CLARENCE E. JEFFERS, OF YORK, PENNSYLVANIA, ASSIGNOR, BY MESNE ASSIGNMENTS, TO OAKES PRODUCTS CORPORATION, A CORPORATION OF MICHIGAN

DEMOUNTABLE WHEEL LOCK

Application filed June 1, 1928. Serial No. 282,166.

This invention relates to locking devices of the band type adapted for use in connection with spare demountable wheels of the type now used, as, for instance, on the model "A" Ford cars.

Such spare wheel carriers comprise a plate supported on the vehicle and having three or more threaded bolts extending therefrom for receiving the hub of the spare wheel to be supported, nuts being provided for the bolts to secure the wheel firmly in place on the carrier. Usually at least one of the nuts has a flat reduced outer end with an aperture therein for the reception of a locking device, such as a padlock.

It is the primary object of my invention to provide a locking band adapted to loop around and receive the rim and tire of the supported wheel and having its ends apertured to receive and fit the body of the lock receiving nut, with the outer end of the band provided with a lock housing for receiving and enclosing the nut and having key controlled locking means for entering the aperture of the lock receiving nut in order to lock the band securely to the nut to prevent unlawful removal of the nut and of the supported wheel.

The invention also incorporates other features of structure and arrangement which will be apparent from the following specification in conjunction with the drawings, in which drawings Figure 1 is a vertical sectional view showing the tire carrier with a spare wheel secured thereto and showing the application of my improved locking band;

Figure 2 is a plan view of the inner end of the locking band showing a circular nut receiving aperture therein;

Figure 3 is a plan view of the lock supporting end of the band;

Figure 4 is a vertical median sectional view of the end of the band and the lock mechanism thereon;

Figure 5 is a section on plane V—V of Figure 4; and

Figure 6 is a section on plane VI—VI of Figure 4.

In the standard construction of the type of car referred to, the spare wheel carrier usually includes a bracket A, a supporting plate B supported by the bracket and provided with three fixed studs or bolts C equipped with nuts D.

The hub E of the wheel has the flange F at its inner end provided with five perforations G, three of which may receive the bolts $c$ for securing the wheel to the plate B. The wheel rim H carries a tire I and is connected with the hub by inner and outer sets of spokes J and K respectively.

Usually one of the spare wheel support nuts, as for example the nut $D_1$, has a rectangular extension forming a locking lug 2 provided with an aperture 3 for the reception of any type of locking device such as an ordinary padlock or other special device to prevent unauthorized removal of the nut. In accordance with my invention, I provide a band 4 which may be of steel and which has its inner end 5 provided with an aperture 6 for receiving the body of the lock receiving nut. This aperture may be circular as shown in Figure 2 or may be polygonal to fit the polygonal nut, the nut shown being hexagonal.

The band is primarily of U-shape and its outer end 7 has the aperture 10 which is preferably polygonal to fit the nut body. Secured on this end of the band by means of a rivet 8 is a lock housing 9. The outer end 11 of the band is rounded and of reduced width to leave shoulders 12 and 13, and the lock housing 9 has the substantially semi-circular wall or lip 14 which at its lower end surrounds the end 11 of the band and abuts the shoulders 12 and 13. Such cooperation of the lip with the band assists the rivet 8 in securely holding the lock housing to and in proper alignment on the band end.

The lock body or housing 9 has the bore 18 for receiving and guiding a cylindrical lock bolt 16, this bolt being adapted, when projected, to enter the aperture 3 of the lug 2 on the nut $D_1$, when the band has been applied to the wheel. A lock cylinder 15 operable by a key is mounted within the housing 9 to cooperate in a well known manner with the locking bolt to shift it into or out of locking position. The opening 17 for the rivet 8 may be in alignment with the bore 18 and the passage receiving the lock cylinder so that before the locking bolt and cylinder are inserted the rivet may be applied to lock the housing to the band.

After a wheel has been applied to the carrier the nuts are applied to the studs and the locking band is then slipped over and around the wheel rim and tire and the inner end 5 is applied with its aperture 6 receiving the locking nut D₁. The end 7 of the band is then swung so that the lock housing will receive the locking nut body through its aperture 10. The key is then manipulated to shift the locking bolt 16 into the aperture 3 of the locking nut and then the band will be firmly locked in place. The band being anchored to the wheel rim and tire its polygonal opening receiving the polygonal locking nut will prevent turning of the nut. The lock housing, together with the band end, will practically entirely enclose the locking nut to prevent access thereto with tools such as wrenches, and by means of the locking bolt 16 the band will be securely retained secured to the locking nut.

My improved locking means is simple and efficient and is economical to manufacture and can be readily applied to lock wheels to the spare wheel carrier. It is evident that instead of having the band of a single length of metal it may be of hinged or two part formation. Other changes and modifications may be made without departing from the scope and spirit of the invention as outlined in the appended claims.

Having thus described the invention, what I claim is:

1. In a device of the class described, a metal loop-shaped member adapted to straddle a tire and having two ends, one over the other, one of said ends being provided with means for receiving a wheel retaining nut having an aperture, the other of said ends being provided with means for engaging the wheel retaining nut to prevent rotation of the nut relatively to the loop-shaped member, and a lock structure secured to said other end to receive the apertured end of the retaining nut, said lock structure comprising a locking bolt adapted to be engaged in the retaining nut aperture to thereby lock the loop-shaped member against removal from said nut.

2. In a device of the class described, a metal loop-shaped member adapted to straddle a tire and having inner and outer ends provided with openings for receiving a wheel retaining nut having an aperture at its end, the opening of one of said ends being polygonal to fit the polygonal shape of the nut whereby to prevent rotation of the nut relatively to the loop-shaped member, a locking housing secured to the outer end of said member to receive the outer apertured end of the nut, a locking bolt in said housing, and key-controlled means in said housing for shifting said locking bolt into said nut aperture to thereby lock said member against removal from said nut.

3. A lock for securing a spare wheel or rim to a support, said lock including a case having a recess into which a retaining nut extends, a locking bolt mounted in said case and adapted to be projected into said recess to engage and lock said nut therein, key operated means for operating said bolt, and means engaged with the nut and case for preventing rotation of said case.

4. A lock for securing a spare wheel or rim to a support, said lock including a case having a recess into which an apertured extension of a retaining nut extends, a locking bolt mounted in said case and adapted to be projected into said recess to engage within said aperture and lock said nut therein, key operated means for operating said bolt, and means engaged with the nut and case for preventing rotation of said case.

5. A lock for securing a spare wheel or rim to a support, said lock including a case having a recess shaped to fit and to receive the flattened apertured end of a retaining nut, a locking bolt mounted in said case and adapted to be projected into said recess and into the hole in said nut, key operated means for operating said bolt, and means engaged with the nut and case for preventing rotation of said case.

In testimony whereof I affix my signature.

CLARENCE E. JEFFERS.